US005402297A

United States Patent [19]

Ouchi et al.

[11] Patent Number: 5,402,297

[45] Date of Patent: Mar. 28, 1995

[54] COMMUTATING TYPE DC CIRCUIT BREAKER ARRANGEMENT

[75] Inventors: Shigetoshi Ouchi; Haruo Honda; Toru Yoshida; Yukio Kugoh; Fumihisa Ichikawa; Tutomu Kanno, all of Hitachi; Takashi Ichinose, Toukai; Hideaki Tsuda, Hitachi, all of Japan

[73] Assignee: Hitachi, Ltd., Tokyo, Japan

[21] Appl. No.: 18,190

[22] Filed: Feb. 16, 1993

[30] Foreign Application Priority Data

Feb. 20, 1992 [JP] Japan .................................. 4-033117

[51] Int. Cl.[6] ............................................... H02H 3/00

[52] U.S. Cl. ............................................ 361/4; 361/1

[58] Field of Search ...................... 361/1, 2, 3, 4, 5, 8, 361/9, 10, 13

[56] References Cited

U.S. PATENT DOCUMENTS 3,708,718 1/1973 Hoffmann et al. ...................... 361/4

4,056,836 11/1977 Knauer ................................... 361/4

FOREIGN PATENT DOCUMENTS 108279 5/1984 European Pat. Off. .

178733 4/1986 European Pat. Off. .

411663 2/1991 European Pat. Off. .

2608264 11/1976 Germany .

*Primary Examiner*—A. D. Pellinen

*Assistant Examiner*—Sally C. Medley

*Attorney, Agent, or Firm*—Antonelli, Terry, Stout & Kraus

[57] ABSTRACT

A commutating type DC circuit breaker arrangement comprising: a vacuum circuit breaker having a movable electrode and stationary electrode; a series circuit of a capacitor, a saturation reactor and a commutating switch which is connected in parallel with the vacuum circuit breaker; and an electrical relay for detecting a predetermined electrode open position at which a sufficient insulating distance between the movable electrode and the stationary electrode is maintained via movement of a predetermined position on an actuating rod for the movable electrode and for closing the commutating switch in response to the detection of the predetermined electrode open position.

4 Claims, 2 Drawing Sheets

COMMUTATING TYPE DC CIRCUIT BREAKER ARRANGEMENT

BACKGROUND OF THE INVENTION

1. Field of the Invention

The present invention relates to a commutating type DC circuit breaker arrangement in which a commutating circuit is improved which closes a commutating switch after interruption of a vacuum circuit breaker and modifies a DC arcing current into an alternating waveform via the commutation to complete the interruption.

2. Description of Related Art

In a circuit of a commutating type DC circuit breaker disclosed in JP-A-3-67429 (1991) which corresponds to EP-A2-0411663, a vacuum circuit breaker is connected in series to a DC circuit and a commutating circuit composed of a capacitor, a saturation reactor and a commutating switch is connected in parallel with the vacuum circuit breaker. In order to interrupt a DC current by making use of the commutating circuit, the commutating switch is adapted to be closed after a trip command permitting an exciting current to flow through a trip coil is generated from a control circuit for the vacuum circuit breaker. When one of the electrodes of the vacuum circuit breaker is separated from the other electrodes, a DC arcing current flows between the electrodes, and in this instance, when a commutating current from the commutating circuit flowing in the opposite direction to the DC arcing current is superposed over the DC arcing current, the resultant current assumes an alternating current and the DC arcing current is interrupted at a current zero point of the resultant alternating current.

The present inventors noted that when the interruption of the arcing current using a commutating circuit is repeated in the above manner many times, a restriking between electrodes due to interruption failure sometimes occurs. The inventors investigated the causes thereof in many ways and found out the following facts.

Namely, after an interruption command is transmitted to the vacuum circuit breaker, the commutating switch closes with a predetermined delay from the command transmission. However, when the commutating switch closes before the insulation between the electrodes sufficiently recovers and a commutating current flows between the electrodes, the DC arcing current cannot be interrupted. This problem is caused by size errors of many mechanical parts such as levers, links, pins and shafts which constitute an actuating mechanism arrangement for the vacuum circuit breaker. The effect of the size errors in the actuating mechanism arrangement appears on the difference of separating speed of the electrodes, and when the separating speed is slow, the commutating switch closes before the insulation between the electrodes has been sufficiently recovered. As a result, a DC current interruption without fail could not be achieved, which condition is likely to escalate an accident.

SUMMARY OF THE INVENTION

An object of the present invention is to provide a commutating type DC circuit breaker arrangement which interrupts a DC current without fail to thereby prevent escalation of an accident.

For achieving the above object, in the commutating type DC circuit breaker arrangement according to the present invention, a detecting and actuating means, for example, a relay, is provided at a position representing one of the electrodes of the vacuum circuit breaker which has been separated from another electrode to such an extent so as to maintain a sufficient insulation distance between the electrodes, and a commutating switch is adapted to be closed when the relay is actuated.

As a result, at a position where a sufficient insulation distance between the electrodes is obtained a commutating current is superposed over the DC arcing current, the resultant current in a form of an alternating waveform is interrupted without fail at a current zero point, and an escalation of an accident is prevented.

DESCRIPTION OF THE PREFERRED EMBODIMENT

Hereinbelow, one embodiment of the present invention is explained with reference to FIG. 1 and FIG. 2.

Figure 1:
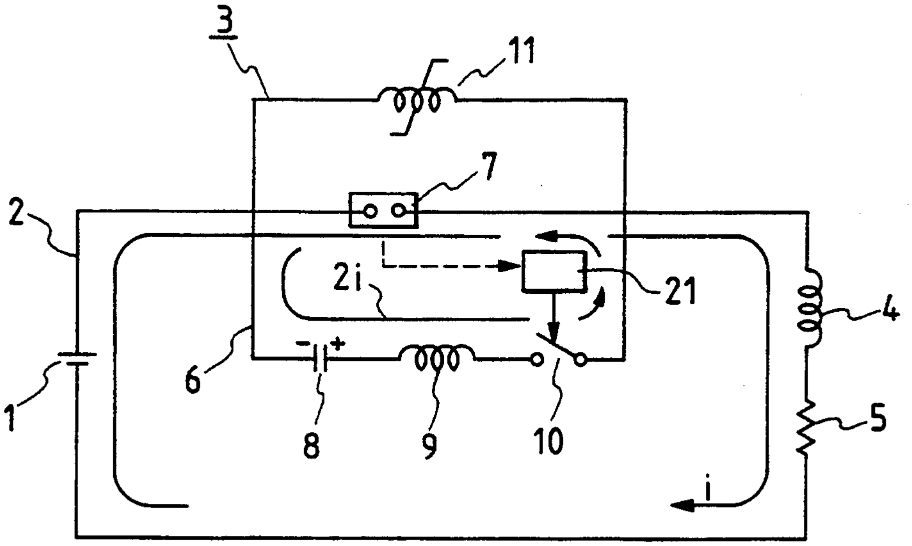
FIG. 1 is a circuit diagram of an embodiment of commutating a type DC circuit breaker arrangement according to the present invention.

In a DC circuit 2 having a DC source 1 as shown in FIG. 1, a commutating type DC circuit breaker and a load including a reactance component 4 and a resistance component 5 are connected. The commutating type DC circuit breaker arrangement 3 connected in the DC circuit 2 is composed of a commutating circuit 6 and a vacuum circuit breaker 7.

The commutating circuit 6 is constituted by connecting a capacitor 8, a reactor 9 and a commutating switch 10 in series and connected in parallel with the vacuum circuit breaker 7, and the capacitor 8 is precharged with a polarity as illustrated. Further a non-linear resistor 11 is also connected in parallel with the vacuum circuit breaker 7. The non-linear resistor 11 is an energy absorbing means for absorbing electromagnetic energy stored such as in a stray inductance on the DC circuit 2.

Figure 2:
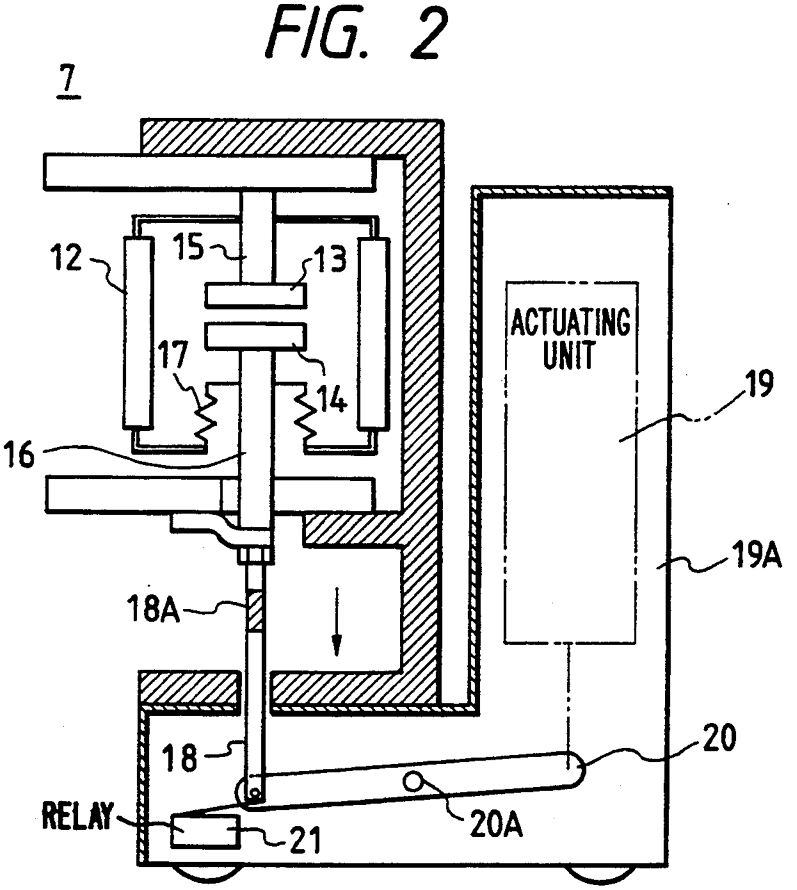
FIG. 2 is a vertical cross sectional view of a vacuum circuit breaker in FIG. 1.

In the vacuum circuit breaker 7 as illustrated in FIG. 2, a pair of electrodes 13 and 14 are disposed in a vacuum vessel 12, and rods 15 and 16 are secured to the back sides of the respective electrodes 13 and 14 and extend outside from the vacuum vessel 12. Between the rod 16 and an end plate of the vacuum vessel 12 a bellows 17 is installed. The bellows 17 serves to permit the rod 16 to move in an arrowed direction while maintaining a vacuum in the vacuum vessel 12. The rod 16 is coupled to an actuating rod 18 via an insulating rod 18A, and the actuating rod 18, an actuating unit 19 and a link 20 are respectively coupled via respective pins. When the link 20 rotates around a pivotal axis 20A, for example, the actuating rod 18 moves downward and presses a relay 21.

Figure 3:
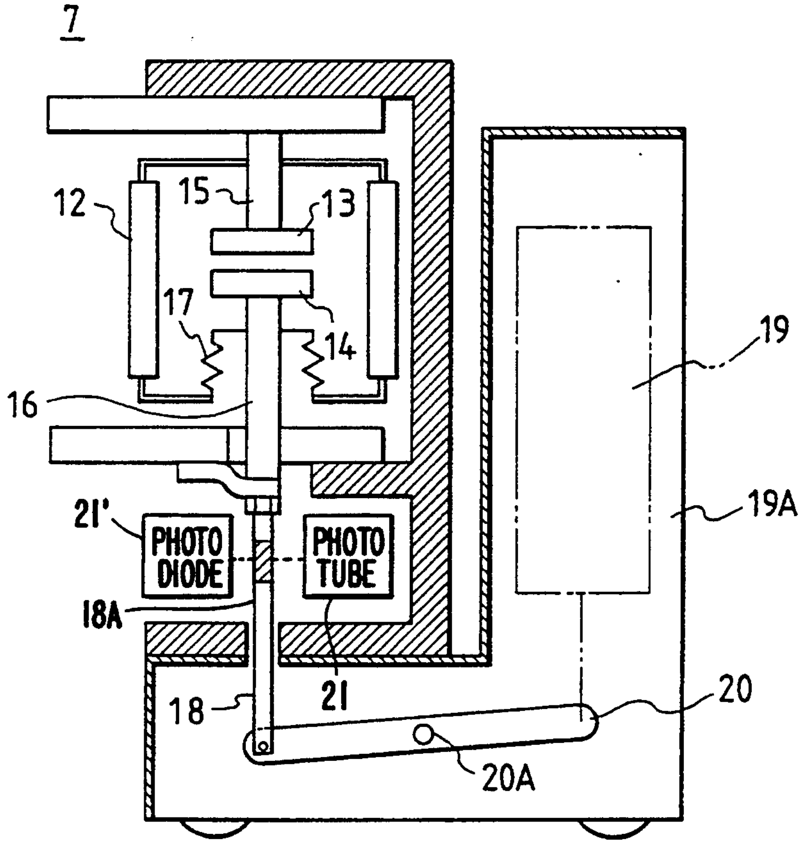
FIG. 3 is the vacuum circuit breaker of FIG. 2, with a phototube/photodiode arrangement substituted for a relay arrangement.

The relay 21 is mounted on a chassis 19A for the actuating unit 19 at a position corresponding to a predetermined open electrode position of the movable electrode 14 representing a predetermined insulation distance between the electrodes 13 and 14, and when the relay 21 is closed the commutating switch 10 is also closed. Further, in place of the relay 21, a combination of a photodiode 21 and a phototube 21'' (FIG. 3) can be used. In this instance, light emitted from the photodiode is received by the phototube before the movable electrode 14 reaches the predetermined open electrode position representing a predetermined insulation distance between the electrodes. When the movable electrode 14 reaches the predetermined open electrode position the light emitted from the photodiode is adapted to be interrupted by an interrupting means, for example, a projecting plate provided at the actuating rod 18, and the commutating switch 10 is caused to be closed. As an alternative, a longitudinal slot may be provided in the actuating rod 18 along the moving direction thereof for detecting the predetermined electrode open position.

Now, an interrupting operation of DC current i with the commutating type DC circuit breaker arrangement 3 is explained.

When the actuating unit 19 for the vacuum circuit breaker 7 is actuated to move the actuating rod 18 and the rod 16 in the arrowed direction, the movable electrode 14 moves to separate from the stationary electrode 13 and a DC arcing current i flows between the electrodes. When the movable electrode 14 reaches the predetermined open electrode position at which a sufficient insulating distance between the electrodes is obtained, the actuating rod 18 presses the relay 21 to close the commutating switch 10. Then a commutating current 2*i* caused by discharging the precharged capacitor 8 superposes over the DC arcing current i and the DC arcing current is modified into an alternating waveform, and thereby the DC arcing current is interrupted without fail at a current zero point.

In the commutating type DC circuit breaker arrangement 3, the relay 21 which causes the commutating switch 10 to close is provided at a predetermined position corresponding to the predetermined electrode open position at which a sufficient insulating distance between the electrodes is obtained. Accordingly, even if the electrode separating speed is slow, the relay 21 is never actuated to close the commutating switch 10 before the actuating rod 18 reaches the predetermined position corresponding to the predetermined electrode open position at which a sufficient insulating distance between the electrodes is obtained, and a restriking between the electrodes is prevented. Accordingly, DC arcing current is interrupted without fail at a current zero point and an escalation of an accident is prevented.

Further, when a combination of a photodiode and a phototube is used in place of the relay 21, it is enough only to provide a through hole in the rod 16, and therefore the structure for the position detecting and switch actuating means is simplified.

According to the commutating type DC circuit breaker arrangement according to the present invention as explained above, a DC arcing current is interrupted without fail, therefore, an escalation of an accident is prevented.

We claim:

1. A commutating type DC circuit breaker arrangement comprising:

a vacuum circuit breaker having a movable electrode and a stationary electrode;

a series circuit of a capacitor, a saturation reactor and a commutating switch connected in parallel with said vacuum circuit breaker; and a detecting and closing means for detecting an actual physical predetermined electrode open position of said movable electrode at which a sufficient insulating distance between said movable electrode and said stationary electrode is maintained, such detecting being conducted with respect to a physical movement of a predetermined position on an actuating rod for said movable electrode and for closing said commutating switch in response to detection of said predetermined electrode open position.

2. A commutating type DC circuit breaker arrangement according to claim 1, wherein said detecting and closing means is an electrical relay which is physically actuated by said actuating rod when said predetermined position on said actuating rod moves by a predetermined physical distance.

3. A commutating type DC circuit breaker arrangement according to claim 1, wherein said detecting and closing means is a combination of a photodiode and a phototube which is actuated by said actuating rod when said predetermined position on said actuating rod moves by a predetermined physical distance.

4. A commutating type DC circuit breaker arrangement according to claim 1, wherein said capacitor is precharged.

* * * * *